(12) United States Patent
Distel

(10) Patent No.: US 6,752,886 B2
(45) Date of Patent: Jun. 22, 2004

(54) METHOD AND APPARATUS FOR ULTRASONIC PROCESSING OF WORKPIECES

(75) Inventor: Armin Distel, Trossingen (DE)

(73) Assignee: Maschinenfabrik Spaichingen GmbH, Spaichingen (DE)

(*) Notice: Subject to any disclaimer, the term of this patent is extended or adjusted under 35 U.S.C. 154(b) by 67 days.

(21) Appl. No.: 09/954,584

(22) Filed: Sep. 17, 2001

(65) Prior Publication Data

US 2002/0100534 A1 Aug. 1, 2002

(30) Foreign Application Priority Data

Sep. 18, 2000 (DE) .......................................... 100 46 451

(51) Int. Cl.⁷ .............................................. B29C 65/08
(52) U.S. Cl. ...................... 156/64; 156/73.1; 156/368; 156/580.1; 156/580.2
(58) Field of Search ...................... 156/64, 73.1, 290, 156/358, 359, 368, 580.1, 580.2

(56) References Cited

U.S. PATENT DOCUMENTS

| | | | |
|---|---|---|---|
| 3,784,079 A | | 1/1974 | Spanjer |
| 4,341,574 A | | 7/1982 | Landes |
| 4,746,051 A | | 5/1988 | Peter |
| 4,818,313 A | * | 4/1989 | Sundberg ...................... 156/64 |
| 4,865,687 A | * | 9/1989 | Pierson ...................... 156/73.1 |
| 5,435,863 A | * | 7/1995 | Frantz ........................ 156/64 |
| 5,846,377 A | * | 12/1998 | Frantz et al. ................ 156/359 |
| 5,855,706 A | * | 1/1999 | Grewell ........................ 156/64 |

FOREIGN PATENT DOCUMENTS

| | | |
|---|---|---|
| DE | 31 38 520 A1 | 1/1983 |
| DE | 34 29 776 A1 | 2/1986 |
| DE | 42 06 584 A1 | 9/1993 |
| DE | 44 39 470 C1 | 5/1996 |
| DE | 297 13 448 U1 | 12/1997 |
| SU | 1 315 341 A1 | 6/1987 |

* cited by examiner

*Primary Examiner*—James Sells
(74) *Attorney, Agent, or Firm*—Michael J. Striker

(57) ABSTRACT

A method and an apparatus for ultrasonic processing of workpieces (6) with a vibratory structure (1) comprising a sonotrode (3) and a converter (2). Energy is fed to the converter (2) by means of an ultrasonic generator (7), which is switched on and off by electrical switch-on and switch-off signals respectively, only for the duration of processing cycles. According to the invention the switch-off signals are generated on the basis of at least one state parameter (P) of the generator (7).

18 Claims, 3 Drawing Sheets

METHOD AND APPARATUS FOR ULTRASONIC PROCESSING OF WORKPIECES

BACKGROUND OF THE INVENTION

This invention relates to a method for ultrasonic processing of workpieces with a vibratory structure comprising a sonotrode and a converter wherein ultrasonic energy is supplied to the converter by means of an ultrasonic generator which is switched on and off by electrical switch-on and switch-off signals respectively, only for the duration of processing cycles.

This invention also relates to an apparatus for ultrasonic processing of workpieces, which apparatus comprises a vibratory structure having a sonotrode and an electromechanial converter, a generator connected to said converter and adapted to supply ultrasonic energy, means for generating switch-on and switch-off signals for said generator at the start and end respectively of processing cycles, and at least one output means for providing a selected electrical state parameter (P) of said generator.

Methods and apparatuses of this type are used in particular for join two workpieces by spot, rivet, stud or surface welding, wherein at least one of the two workpieces consists of a thermoplastic material. The workpieces are heated locally strongly enough to melt together. The heating of the workpieces is effected in that a sonotrode excited to vibrate mechanically is pressed against at least one of the workpieces. In processing of only one workpiece, these vibrations can also be used to shape or cut the workpiece. Since sonotrodes vibrate as a rule at ultrasonic frequencies of 20 kHz or 35 kHz for example, such processing operations are generally referred to as ultrasonic processing. The main field of use of the described apparatuses lies in the processing of plastics parts, which are used to house electrical devices and to a special degree in the automobile industry, both for body parts such as bumpers and also for interior linings, such as door linings and consoles. The sonotrodes in contact with the workpiece are designed variously, depending on the nature and material of the workpieces to be processed.

In known apparatuses of this kind (DE 4 439 470 C1) the mechanical vibrations are generated by an electromechanical converter, as a rule consisting of a piezoelectric crystal, which is excited from an ultrasonic generator with an electric alternating current circuit. The converter vibrates with a predetermined amplitude at a corresponding ultrasonic resonance frequency, where typical values are e.g. 35 kHz for the frequency and 7 μm for the amplitude. The vibratory structure or resonant unit consisting of the converter, sonotrode and optionally an interposed amplitude transformation piece is so designed that it is also in resonance at this resonance frequency and the working surface associated with the workpiece vibrates with an amplitude of e.g. 10–40 μm.

Spot, rivet and stud welds are as a rule carried out in that the sonotrode is pressed against selected points or on a so-called weld or rivet pin (dome) of the workpiece, which pin is formed on a first workpiece lying on an anvil, projects through a corresponding hole of a second workpiece to be attached to this and is for example 10 mm high and optionally of hollow cylindrical form. In order to avoid lateral escape of the material of the pin becoming soft in the ultrasonic processing and to achieve an optically pleasing welded connection, the sonotrode as a rule has at its working surface to be applied to the weld or rivet pin, a concave domed, ring-shaped heating zone and a ring-shaped contact surface surrounding this, wherein the contact surface lies on the upper workpiece in question at the end of the welding operation and accordingly encircles the weld site with a ring shape which can be circular, rectangular or any other shape.

Among other things, the instant at which the supply of ultrasonic energy to the sonotrode is terminated is significant for the quality of a weld effected in this way. If the energy supply lasts too long, the ring-shaped contact surface can burn into the upper workpiece, which is undesirable for optical and quality reasons. If on the other hand the energy supply is terminated before the contact surface is bearing on the upper side of the workpiece in question, the weld may be incomplete, with the result that the interlocking or force fit produced by the connection is defective.

Corresponding problems arise with other kinds of welding, especially surface welds with the aid of so-called "energy directing structures" and other ultrasonic processes.

Numerous methods and apparatuses have already become known for ensuring an adequate weld quality and are directed towards finding the right switch-off time for the energy supply but as a whole they are not completely satisfactory. It is known for example to predetermine a precisely defined welding duration or to feed a precisely defined amount of energy to the converter during each operating cycle. Both methods operate inaccurately, since no tolerances can be taken into account, which arise from weld pins of different heights for example. These methods therefore do not always lead to accurate switching off of the supply of the ultrasonic energy when the contact surface of the sonotrode reaches the surface of the workpiece in question. Corresponding problems arise in these of apparatuses in which the distance to be covered by the sonotrode is adjusted to an absolute value depending on the current welding operation or is monitored by means of electrical sensors. Finally is known to associate a sensor in the form of mechanical feeler with each sonotrode, which runs ahead of the sonotrode and is pushed against the force of a spring after application to the surface of the workpiece in question, until it triggers a switch-off signal for the energy supply by means of an electric switch, at the end of a defined path of movement. Such devices do facilitate a defined welding operation and tolerance compensation and thus ensure a high quality of the welded connection. However it is a disadvantage that they require costly manual adjustments, are inflexible in respect of workpieces which are of like structure but made from different materials (e.g. in the production of inner linings covered with different materials for private car doors) and above all an individual feeler has to be associated with every sonotrode present in a processing station, which leads to substantial space problems in the simultaneous processing of a plurality of closely adjacent weld sites.

In addition it is generally known in quality control to monitor constantly various state parameters of the apparatus initially specified, e.g. the ultrasonic power fed to the converter (DE 3429 776 C2). The production of more satisfactory welded connections can however only be ensured inadequately with such quality control.

SUMMARY OF THE INVENTION

It is, therefore, an object of this invention of improving the method and the apparatus of the kind above specified by avoiding the demand of additional sensors, feelers and/or other auxiliary means in the region of the sonotrodes.

An further object of this invention is to improve the method and the apparatus above specified such that faultfree welding results and welded workpieces with high quality are achieved.

Yet another object of this invention is to design the method and the apparatus mentioned above such that an exact termination of ultrasonic energy supply to the sonotrode is possible.

A further object of this invention is to reduce the expense of the apparatus mentioned above.

These and other objects are solved by a method and an apparatus being characterized in that the switch-off signal are generated on the basis of at least one state parameter of the generator.

The invention rests on the recognition gained through protracted investigations that various parameters or state parameters within the ultrasonic generator alter measurably when the sonotrode contact surfaces bear on the surface of the workpieces in question. These changes are used according to the invention as a criterion for the termination of the welding operation and to create a switch-off signal terminating the supply of energy. Additional components in the region of the sonotrodes, e.g. for switching off on reaching a predetermined depth, are therefore superfluous. Moreover the invention can be employed with all normally used workpiece materials.

Further advantageous features of the invention will appear from the following description and the claims.

BRIEF DESCRIPTION OF THE DRAWINGS

The invention will now be explained in more detail by way of embodiments in conjunction with the accompanying drawings, in which.

DESCRIPTION OF PREFERRED EMBODIMENTS

Figure 1:
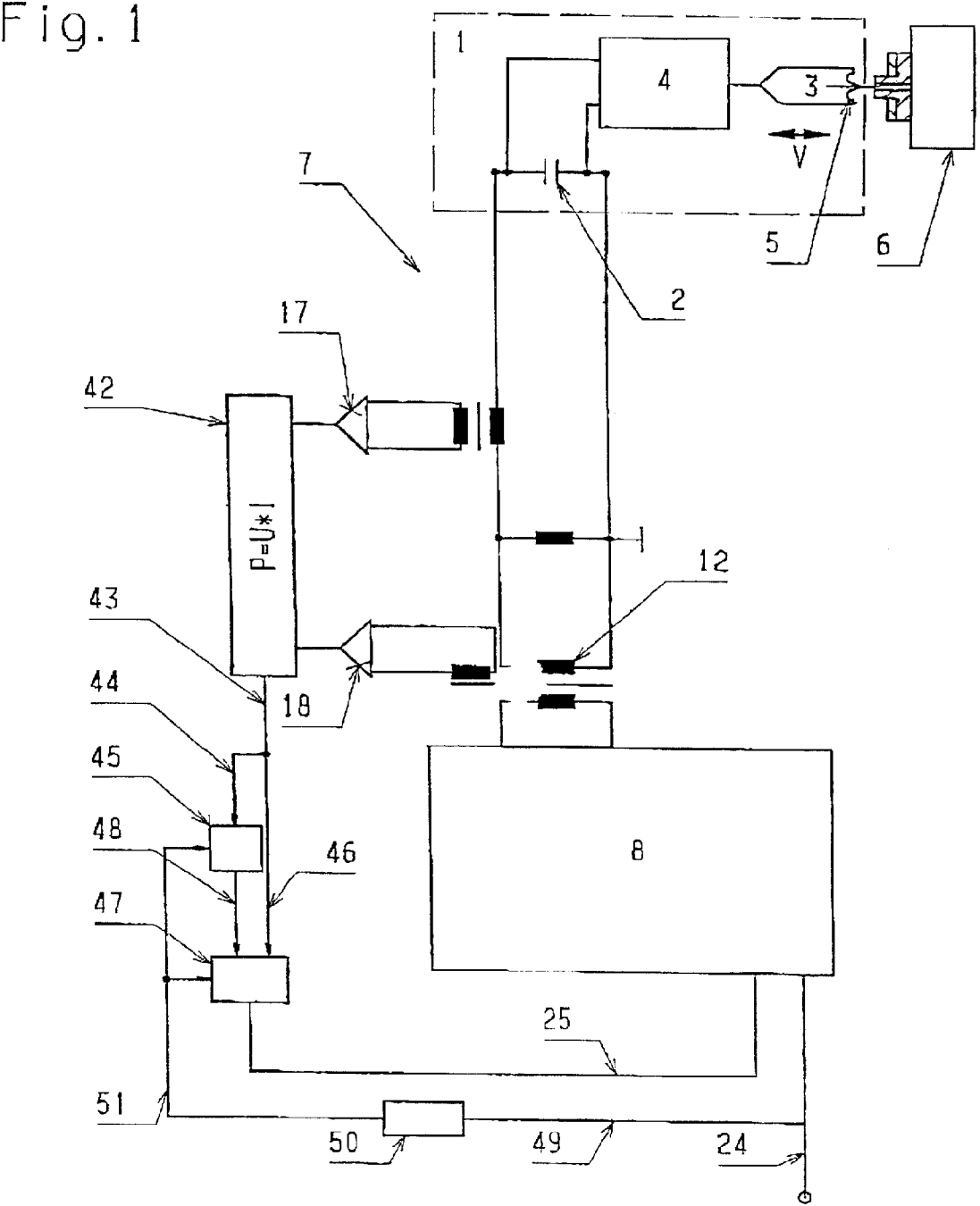
FIG. 1 shows a control and regulating circuit according to the invention for an apparatus for ultrasonic processing of workpieces.

FIG. 1 shows the essentials of the regulating and control elements of a general embodiment of the invention in a schematic representation. A conventional vibrating structure, denoted as a whole by the reference numeral 1, consists of an electromechanical, preferably piezoelectric converter 2, a sonotrode 3 coupled mechanically thereto and optionally an interposed amplitude transformation piece 4, wherein the sonotrode 3 can have a working surface 5 applied to a workpiece 6, in order to carry out a processing operation in known manner, especially a welding operation. The vibrating structure 1 is coupled for this purpose to a feed unit, not shown, and is movable to and fro by this in a frame, also not shown, generally perpendicular to the workpiece surface in the direction of a double arrow $v_s$. The sonotrode 3 and optionally the amplitude transformation piece 4 are so designed that the vibrating structure 1 vibrates resonantly at the resonance frequency of the converter 2, with substantially the same frequency. The working surface 5 of the sonotrode 3 vibrates with a mechanical amplitude of vibration fixed on manufacture of 7 µm to 30 µm for example. Moreover the spacing of the working surface 5 from the converter 2 is so selected that it always lies at an anti-node of vibration.

Apparatuses for ultrasonic processing of this kind are generally known (e.g. DE 34 39 776 C2, DE 42 06 584C2, DE 44 39 470C1 and DE 29 713 448 U1) and therefore do not need more detailed description.

The piezoelectric converter 2 is connected electrically to an alternating current circuit of an ultrasonic generator generally denoted by the reference numeral 7. An alternating current adapted to excite the converter 2 is generated in the alternating current circuit, with its frequency corresponding to the frequency of vibration of the converter 2 and the sonotrode 3 and whose strength is characteristic for the mechanical amplitude of vibration of the sonotrode 3 in the region of the working surface 5.

A power stage 8 of the generator 7 utilising transistors for example serves to generate the current in the alternating current circuit and is connected in the embodiment to the primary winding of a transformer 12 and provides a high frequency signal at the desired frequency.

The secondary winding of the transformer 12 is connected in parallel with the converter 2, which can be regarded electrically as a capacitor, in the alternating current circuit, while the transformer 12 is so dimensioned in the embodiment that its secondary winding creates an alternating voltage of 600 Veff for example. The alternating current circuit preferably includes inductively coupled elements, which each provide an electrical state parameter e.g. at outputs 17 and 18. The output 17 for example is arranged to provide a signal which represents the effective current flowing in the alternating current circuit while the output 18 serves to provide the alternating voltage present on the secondary winding.

For energy reasons the alternating current circuit with the elements 2 and 12 is preferably designed as a whole as an oscillatory circuit, which is matched by the manufacturer of the apparatus to the resonance frequency of the converter 2 and operates under normal conditions at a frequency of about 35 kHz. Moreover the alternating current circuit can be a component of a regulating circuit, which additionally includes the power stage 8 and will maintain the preselected amplitude of vibration of the sonotrode 3. The measurement of the actual value of the amplitude can be effected through the measurement of any suitable value in the alternating current circuit of the generator 7.

The sonotrode 3 is moreover always vibrated only when a processing cycle is actually to be carried out, i.e. the alternating current circuit or even the whole regulating circuit is switched off in the pauses between two processing cycles and is switched on again shortly before the beginning of the next processing cycle. To this end a switch-on signal is fed for example to the power unit 8 through a line 24 and a switch-off signal is fed through a line 25. This means that the regulating circuit begins to act after the switching on. The build-up time of 0.5 sec for example is normally so short that the sonotrode 3 has the desired amplitude of vibration on contacting the workpiece 6.

According to a particularly preferred embodiment, the regulating circuit is realised through microprocessor technology customary today. However, the current in the alternating current circuit can alternatively be generated in any arbitrary way known generally in ultrasonic welding.

Figure 2:
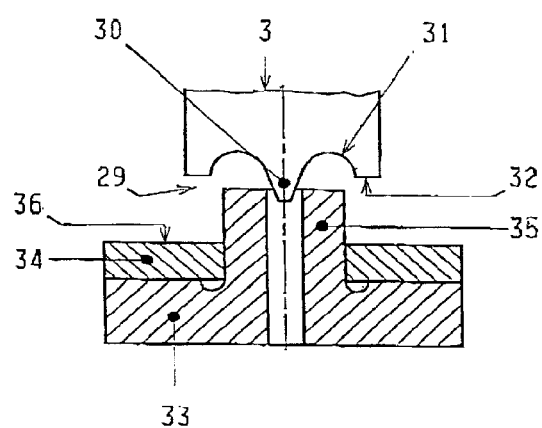
FIG. 2 is a schematic cross-section through two workpieces, which are to be joined by ultrasonic welding with the aid of the apparatus according to FIG. 1.
Figure 3:
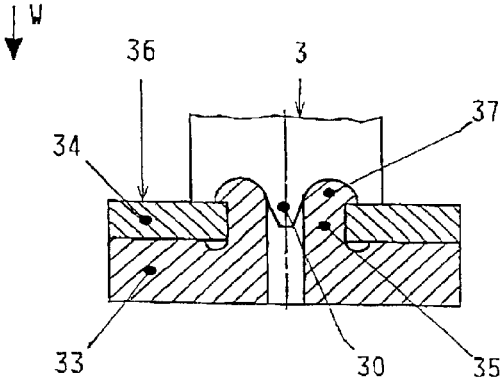
FIG. 3 is section corresponding to FIG. 2 after carrying out the welding.

FIGS. 2 and 3 show schematically details of the sonotrode 3 provided in the embodiment and adapted for spot, rivet or stud welding. It can be moved by means of a feed device, not shown, in the direction of an arrow w and has a working surface 29. In the embodiment the working surface 29 is circular and is provided with a projecting stud 30 in its centre. The working surface 29 is provided with a concave recess in a heating zone 31 concentrically is surrounding the 30, while it has an annular contact surface 32 in an outer region surrounding the recess and the stud 30 concentrically. The surface 32 is normally set back somewhat in the direction of the arrow w relative to the stud 30 but can also be flush with or project slightly relative to the stud 30.

Two workpieces 33 and 34 to be welded together are further shown in FIGS. 2 and 3. The lower workpiece 33 lies, when a processing cycle is effected, below the sonotrode 3, e.g. on an anvil, not shown. It consists moreover of a thermoplastic material and is provided in the normal way with a projecting, here hollow cylindrical rivet pin or dome 35. On the other hand, the workpiece 34 provided with a hole of the size of the rivet pin 35 can consist of any arbitrary material. It is so placed before the processing cycle on the workpiece 33 that its hole receives and is penetrated by the rivet pin 35. Moreover the rivet pin 35 has such a length that it projects by a predetermined amount beyond the workpiece 34, as FIG. 2 shows.

A processing cycle is commenced in that the sonotrode 3 is moved in the direction of the arrow w by means of the feed unit, in order to approach its working surface 29 to the workpieces 33, 34. The arrangement in the embodiment is such that the stud 30 firstly enters the hollow space of the rivet pin 35 and the sonotrode 3 is thus centred, while the upper edge of the rivet pin 35 then comes into contact with the concave heating zone 31. At this instant or even just before, the sonotrode 3 is set into mechanical vibration, in that a switch-on signal is applied to the power unit 8 (FIG. 1) over the line 24, being generated by a switch coupled to the feed unit for example or any other member synchronised with the movement of the feed unit. The material of the rivet pin 35 in contact with the working zone 31 is gradually melted by the excitation of the sonotrode 3 and is received in the concave recess with further downwards movement of the sonotrode 3 In further course the contact surface 32 of the sonotrode 3 finally bears on a surface 36 facing it of the upper workpiece 34 (FIG. 3). The material of the rivet pin 35 received in the concave recess is thereby deformed into a rivet head 37 (FIG. 3), which lies on the edge of the workpiece 34 adjoining the hole and connects this workpiece to the workpiece 33 essentially by interlocking. The energy supply to the converter 2 is then switched off and the sonotrode 3 is raised, again, in order to begin a new working cycle.

The supply of ultrasonic energy to the sonotrode 3 should be interrupted as closely as possible when its contact surface 32 lies on the surface 36 of the workpiece 34. If the energy supply is interrupted too early, an air gap remains between the surface 36 and the rivet head 37, which results in an inadequately interlocked or non-positive attachment of the joint and moreover in undesirable play between the workpieces 33, 34. If on the other hand the energy supply to the sonotrode 3 is switched off too late, its contact surface 32 can dig into the surface 36 of the workpiece 34 and thus in particular create optically unattractive edge zones. This is one result of the fact that the control and regulating circuit according to FIG. 1 attempts to keep the amplitude of the sonotrode vibrations substantially constant even if application of the contact surface 32 to the surface 36 normally results in a reduction of the amplitude of the sonotrode vibrations on account of the additional loading. The contact surface 32 acts, therefore, in the same manner as previously described for the heating zone 31 on the material of the workpiece 34 and starts to melt this material uncontrollably.

This problem is overcome according to the invention in that the switch-off signal in the line 25 (FIG. 1) is generated substantially exactly when the contact surface 32 of the sonotrode 3 comes into contact with the surface 36 of the workpiece 34. This develops from the recognition that at least one of the electrical state parameters of the ultrasonic generator 7 shown in FIG. 1 changes at this instant in a characteristic, measurable way which can be evaluated for generation of a switch-off signal.

Figure 4:
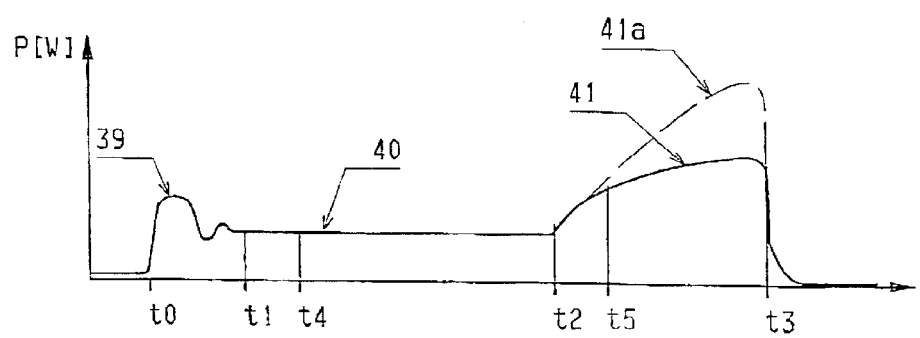
FIG. 4 is a graph which shows the dependence of the ultrasonic effective power fed to a converter of the apparatus according to FIG. 1 as a function of time.

As an example, the course of a curve is shown in FIG. 4, which represents the electrical effective power expressed in watts fed to the converter 2 versus time measured in seconds. It is assumed that the energy supply is initiated at an instant t0 by a switch-on signal in the line 24. The effective power P then increases strongly during a build-up phase, which lasts for about 0.5 sec for example, along a curve section 39, in order then to fall off to a curve section 40 having a substantially constant level at an instant t1. This curve section 40 results when the heating zone 31 of the working surface 29 of the sonotrode 3 acts on the rivet pin 35 and causes it to melt.

On application of the contact surface of the sonotrode 3 to the surface 36 of the workpiece 34 (time t2 in FIG. 4), the effective power P increases strongly along a cure section 41 up to an arbitrarily selected time t3, at which the generator 7 is switched off. This increase is the result of the fact that the regulating circuit begins to operate to maintain a constant amplitude of vibration.

According to an embodiment of the invention being deemed as the best one up to now, this increase is used to generate a switch-off signal. As FIG. 1 shows, the outputs 17 and 18, at which the alternating current I and the alternating voltage U respectively are detected, are connected to two inputs of a multiplier stage 42, in which the product $P=U \cdot I$ is formed and supplied at an output 43. The output 43 is connected on the one hand via a line 44 to a data memory 45 and on the other hand via a line to an input of a comparator 47, which has a second input connected by a line 48 to an output of the data memory 45 and an output connected to the line 25. Finally, the line 24 is connected by a line 49 to the input of a timer 50, which has an output connected by a line 51 to a further input of the data memory 45. The following manner of operation thus results in accordance with the invention.

During a working cycle, the power P is constantly determined. Its current actual value is fed both to the data memory 45 and to the comparator 47. At the same time the timer 50 operates over the line to the effect that, at a predetermined interval of time after appearance of the switch-on signal, e.g. at a time t4, on the one hand the comparator 47 is activated and on the other hand the data memory 45 holds fixed the value of the effective power P present at this time t4 and applies it to the input of the comparator 47 connected thereto. In further operation the comparator 47 compares the power value stored in the data memory 45 with the current actual value which is provided by the multiplier stage 42. When this value is a predetermined amount greater than the value present in the data memory 45, the comparator 47 issues a signal which appears as the switch-off sign in the line 25 and which terminates the supply of ultrasonic energy to the converter 2. The switch-off signal can moreover be used to reset the apparatus to the starting state and to clear the data memory 45.

The interval of time provided by the timer 50 is preferably adjustable and is advantageously selected with t1<t4<t2 of such a value that the data memory 45 accepts a value of the effective power P which occurs in the region of the curve section 40 and is therefore characteristic of an instant between t1 and t2 after completion of a transient period. Moreover the comparator 47 is so designed that it issues the switch-off signal in the line 25 when the instantaneous actual value of the effective power P is a predetermined amount greater than the value stored in the data memory 45 and is obtained at an instant t5 for example. The comparator 45 can to this end have a threshold value switch connected to its output for example. This ensures that the switch off of the supply of energy takes place a predetermined short time after the application of the contact surface 32 to the surface 36 and damage to this surface 36 is reliably avoided. The time t5 can in particular follow very shortly after the time t2 if the time t4 lies reliably in the graph section 40. Without use of the timer 50, the time t4 must be so selected that the effective power P then present is greater than during the build-up process along the curve section 39.

Instead of basing the creation of the switch-off signal on the state parameter "effective power", it can be effected on the basis of any other advantageous electrical state parameter of the generator 7, e.g. on the basis of the frequency at the output of the power stage 8 or the phase shift between the current at the output 17 and voltage at the output 18. The components 42, 45, 47 and 50 must than be suitably adapted. By the concept "on the basis of the state parameter in question" is to be understood that the switch-off signal is created in dependence on what alteration of the state parameter occurs after application of the contact surface 32 to the workpiece 34 in comparison with the previously occurring working operation during a normal operation duration or a duration which has been recognised as usable and which is defined for example by the time interval between t0 and t2 in FIG. 4.

Figure 5:
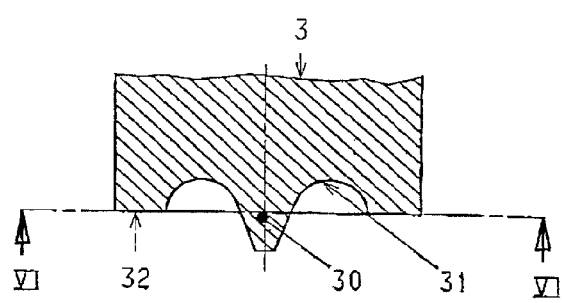
FIG. 5 is an enlarged section through the sonotrode according to FIGS. 2 and 3.
Figure 6:
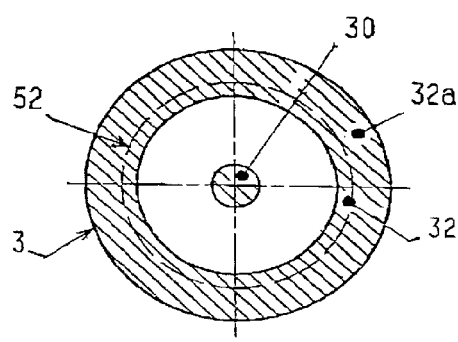
FIG. 6 is a view from below of the sonotrode according to FIG. 5.

It is further proposed according to the invention to make the contact surface 32 as large as possible, in accordance with FIGS. 5 and 6. The result of this is that the state parameter which is considered, here the effective power P, is correspondingly increased on application of the sonotrode 3 to the workpiece 34. This is indicated in FIG. 4 by a curve section 41a shown in broken lines, which is obtain when using a sonotrode 3 according to FIGS. 5 and 6, which—with otherwise like dimensions—has a larger contact surface 32a than a sonotrode 3 which leads to the curve section 41 and is outlined in FIG. 6 by a broken line 52 and which has in fact been proved to be adequate for implementing the desired processing operation.

Figure 7:
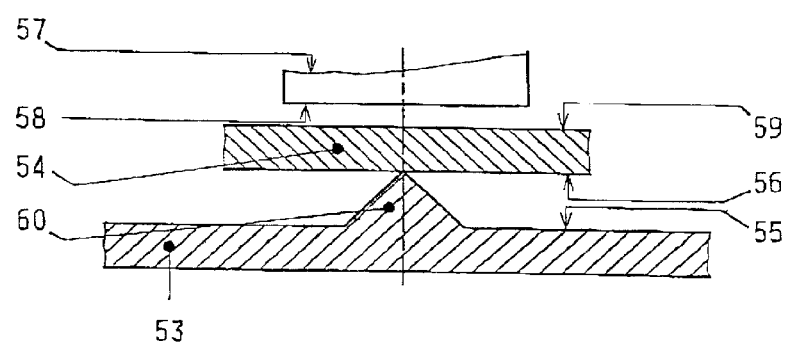
FIG. 7 is a schematic section through an arrangement with an apparatus analogous to FIG. 1 for surface welding.

The invention can be used successfully also with other processes than that explained with reference to FIGS. 2 and 3. This is indicated for example in FIG. 7 with reference to a surface weld, through which two workpieces 53 and 54 are to be joined together along connecting surfaces 55, 56 opposed to one another and using a sonotrode 57, which is applied with a working surface 58 on a surface 59 facing it, e.g. of the workpiece 54, wherein this surface 59 is on the side of the workpiece 54 opposite the connecting surface 56 and is of continuous flat form for example. In such a welding operation one of the connecting surfaces, here the connecting surface 55, is as a rule provided with a wedge shaped, projecting, so-called energy directing stores 60, which consists of a thermo-plastic material. In distinction to FIGS. 2 and 3 the workpiece 54 should here consist of a comparatively hard material, so that the mechanical vibrations of the sonotrode 57 do not lead to melting of its surface 59, but effect vibration of the whole workpiece 54, with the result that the energy directing structures 60 melts and thus welds the two workpieces 53, 54 together as the sonotrode 57 is lowered. In such processing at least one electrical state parameter of the ultrasonic generator 7 employed increases or reduces strongly at the instant at which the two connecting surfaces 55, 56 lie against each other, so that this can be used to generate a switch-off signal. In this case timely switch off of the energy supply has the result that the sonotrode 57 cannot dig into the surface 59 of the workpiece 54.

The invention is not limited to the described embodiments, which can be modified in various ways. In particular it is possible to take account of the course of the state parameter utilised to generate the switch on signal in a different way than as explained above with reference to FIG. 4. For example an average value measured from the time t0 or t1 can be used instead of the absolute value of the state parameter corresponding to the graph section 40 and a switch-off signal be generated when the average value alters appreciably compared with the normal operating cycle or when the current value of the state parameter deviated substantially from the average value. Moreover it is possible so to select the value t5 in FIG. 4 that the energy supply remains switched on for a predetermined length of time after the contact of the sonotrode 3 with the workpiece 34 or of the workpiece 54 on the workpiece 53, when this has been found to be appropriate for achieving a good processing result. Moreover it can be provided that the switching off of the energy supply only takes place when the value of the state parameter is greater than any value which can occur within a processing duration known to be usable. In addition the processes described with reference to FIGS. 2, 4 and 7 and the described sonotrode formes are to be understood solely as examples. It is moreover clear that the described apparatus can comprise a plurality of sonotrodes, which are lowered in a common working stage on to a corresponding plurality of processing sites, and a corresponding plurality of circuits 42 to 51 individually associated with these. Moreover the invention can also be used in an analogous way in spot welding, in which case the selected contact surface 32 of the sonotrode can be substantially greater in comparison and consist of practically the whole sonotrode underside. The generator 7 and the circuit formed by the elements 42 to 51 can also be constructed in a different way from that shown. Finally it will be understood that the various features can also be used in combinations other than those illustrated and described.

It will be understood that each of the elements described above, or two or more together, may also find a useful application in other types of constructions differing from the types described above.

While the invention has been illustrated and described as embodied in a device for ultrasonic treatment of workpiece, is not intended to be limited to the details shown, since various modifications and structural changes may be made without departing in any way from the spirit of the present invention.

Without further analysis, the foregoing will so fully reveal the gist of the present invention that others can, by applying current knowlegde, readily adapt it for various applications without omitting feature that, from the standpoint of prior art, fairly constitute essential characteristics of the generic or specific aspects of this invention.

What is claimed as new and desired to be protected by Letters Patent is set forth in the appended claims.

What is claimed is:

1. A method for connecting two workpieces (33, 34; 53, 54) to each other by ultrasonic welding, comprising the steps of: using a vibratory structure (1) having a sonotrode (3, 57), a convertor (2) and an ultrasonic generator (7) for supplying ultrasonic energy to said converter (2); providing said two workpieces (33, 34; 53, 54) which are to be connected and a piece (35, 60) of a meltable material for welding said workpieces to each other; moving said sonotrode (3, 57) into a direction of one of said workpieces (34, 54); starting a welding process by switching on said ultrasonic generator (7) for setting at least said sonotrode (3, 57) into mechanical vibrations for melting said piece (35, 60); determining a state parameter being representative for a contact between a face (32) of said sonotrode (3) and said one of said workpieces (34) or between both said workpieces (53, 54) as a result of said movement of said sonotrode (3, 57); and terminating said welding process by switching off said ultrasonic generator (7) when said state parameter deviates by a predetermined amount from a preselected value as a result of said contact.

2. A method according to claim 1, wherein a frequency of a current flowing in the generator (7) is used as said state parameter.

3. A method according to claim 1, wherein a phase displacement between a current and a voltage in said generator (7) is used as the state parameter.

4. A method according to claim 1, wherein an electrical ultrasonic power (P) generated by the generator (7) is used as the state parameter.

5. Apparatus for connecting two workpieces (33, 34; 53, 54) to each other by ultrasonic welding and by means of a piece (35, 60) of a meltable material, comprising: a vibratory structure (1) having a sonotrode (3, 57), a converter (2) and an ultrasonic generator (7) for supplying ultrasonic energy to said converter (2); means for moving said sonotrode (3, 53) into a direction of one of said workpieces (34, 54); means (24) starting a welding process by switching on said ultrasonic generator (7) for setting at least said sonotrode (3, 57) into mechanical vibration and for melting said piece (35, 60); means (17, 18, 42, 43) for determining a state parameter being representative for a contact between a face (32) of said sonotrode (3) and said one of said workpieces (34) or between both said workpieces (53, 54) as a result of said movement of said sonotrode (3, 57); and means (25,44–51) coupled with said determining means (17, 18, 42, 43) for terminating said welding process by switching off said ultrasonic generator (7) when said state parameter deviates by a predetermined amount from a preselected value as a result of said contact.

6. Apparatus according to claim 5, wherein a frequency of a current flowing in the generator (7) is said state parameter.

7. Apparatus according to claim 5, wherein a phase displacement between a current and a voltage in said generator (7) is said state parameter.

8. Apparatus according to claim 5, wherein an effective power (P) generated by the generator (7) is the state parameter.

9. Apparatus according to claim 5, wherein said terminating means (25, 44–51) issues a switch off signal when said state parameter deviates by a predetermined amount from values which it can assume during a welding process duration recognized as usable.

10. Apparatus as defined in claim 9, wherein said switch-off signal can be generated when said state parameter (P) deviates by a predetermined amount from an average value which occurs during a processing interval recognized as usable between predetermined instants of time.

11. Apparatus according to claim 9, wherein said terminating means (25, 44–51) can in each case be activated only a predetermined length of time ($t_4$) after switching on ($t_0$) said generator (7).

12. Apparatus according to claim 5, wherein said generator (7) can be switched off in spot, rivet or stud welding at instants in time ($t_5$) which correspond to contact of said surface (32) to said workpiece (34).

13. Apparatus according to claim 12, wherein said contact surface (32a) of said sonotrode (3) is chosen larger that is at least necessary for carrying out a processing during the processing cycles.

14. Apparatus according to claim 5, wherein said generator (7) can be switched off in surface welding with said pieces (60) being designed as energy directions at instants in time which correspond to contact between both said workpieces (53, 54).

15. A method for ultrasonic processing of workpieces (33, 34; 53, 54) with a vibratory structure (1) comprising a sonotrode (3, 57) and a converter (2), wherein ultrasonic energy is supplied to the convertor (2) by means of an ultrasonic generator (7), which is switched on and off by electrical switch-on and switch-off signals respectively, only for the duration of processing cycles, characterized in that the switch-off signals are generated on the basis of ast least one state parameter (P) of the generator (7), wherein a frequency of a current flowing in the generator (7) is used as said state parameter.

16. A method for ultrasonic processing of workpieces (33, 34; 53, 54) with a vibratory structure (1) comprising a sonotrode (3, 57) and a converter (2), wherein ultrasonic energy is supplied to the convertor (2) by means of an ultrasonic generator (7), which is switched on and off by electrical switch-on and switch-off signals respectively, only for the duration of processing cycles, characterized in that the switch-off signals are generated on the basis of ast least one state parameter (P) of the generator (7), wherein a phase displacement between a current and a voltage in said generator (7) is used as the state parameter.

17. Apparatus for ultrasonic processing of workpieces (33, 34; 53, 54), comprising: a vibratory structure (1) having a sonotrode (3, 57) and an electromechanical converter (2), a generator (7) connected to said converter (2) and adapted to supply ultrasonic energy, means (24, 25) for generating switch-on and switch-off signals for said generator at the start and end respectively of processing cycles, and at least one output means (17, 18 or 43) for providing a selected electrical state parameter (P) of said generator (7), wherein said switch-off signals can be generated on the basis of the at least one state parameter (P), wherein a frequency of a current flowing in the generator (7) is said state parameter.

18. Apparatus for ultrasonic processing of workpieces (33, 34; 53, 54), comprising: a vibratory structure (1) having a sonotrode (3, 57) and an electromechanical converter (2), a generator (7) connected to said converter (2) and adapted to supply ultrasonic energy, means (24, 25) for generating switch-on and switch-off signals for said generator at the start and end respectively of processing cycles, and at least one output means (17, 18 or 43) for providing a selected electrical state parameter (P) of said generator (7), wherein said switch-off signals can be generated on the basis of the at least one state parameter (P), wherein a phase displacement between a current and a voltage in said generator (7) is said state parameter.

* * * * *